Patented July 2, 1935

2,006,400

UNITED STATES PATENT OFFICE 2,006,400

PROCESS FOR THE PURIFICATION OF ALCOHOLS

Hermanus Frans Joseph Lorang and Pieter W. van der Sluijs, Amsterdam, Netherlands, assignors to Shell Development Company, San Francisco, Calif.

No Drawing. Application October 8, 1932, Serial No. 636,936. In the Netherlands October 17, 1931

15 Claims. (Cl. 260—156)

The invention relates to a process for the production of alcohols by causing olefines or gases containing olefines, for example those produced in the cracking of mineral oils or mineral oil fractions, to react with sulphuric acid of suitable concentration, and subsequently, by distillation, separating the alcohols produced from the acid liquor after dilution of the latter with water, with or without neutralization of the free acid. The process aims at the manufacture of alcohols free from obnoxious odors.

It is a well known fact that the alcohol prepared by causing olefines to react with sulphuric acid of suitable concentration and subjecting the reaction liquid thus obtained to distillation, if desired after hydrolysis, has an obnoxious odor, which in many cases makes it difficult to use this synthetic product. The obnoxious odor is ascribed to the presence of polymerization products formed in certain by-reactions.

Attempts have, therefore, been made to find some means for removing the obnoxious odor. Thus, for example, it has been proposed to shake out the alkyl-sulphuric acid with a high boiling paraffin hydrocarbon, such as liquid paraffin, if desired after dilution with water or after hydrolysis. The constituents possessing the obnoxious odor are then dissolved in the paraffinum liquidum.

It has also been proposed to shake out the alcohols, obtained by hydrolysis and distillation, with liquid paraffin, if desired in the presence of water.

Now the invention provides a novel agent for the removal of the obnoxiously odorant substances, which consists of Edeleanu extract or a similar extract from a mineral oil or mineral oil fraction, such as furfurol extract, acetone extract and the like.

It is also with these substances that the dilute aqueous solution of alkyl-sulphuric acid, either or not partly or completely hydrolyzed, or the alcohols separated therefrom if desired diluted with water, may be treated to great advantage for the removal of the obnoxiously odorant constituents. In conformity with the known methods the material to be treated with the said extracts may be shaken out.

The advantage of the novel agent lies in that it is very cheap, it being in fact obtained as a waste product in the manufacture of mineral oils and mineral oil fractions, and that it is generally used as fuel oil. For the rest the effect is the same as that obtained with paraffinum liquidum.

Thus for example Edeleanu extract, after use for the present purpose, may further conveniently serve as a fuel oil. Liquid paraffin, however, being an improved product is much more expensive and must be refined after it has been used for the removal of the obnoxiously odorant substances.

Extracts of widely divergent boiling limits may be used. Care should be taken, however, to separate the extract as fully as possible from the treated product. Nevertheless on shaking out the diluted alkyl-sulphuric acid or the alcohols separated therefrom a small portion of the shaking agent remains in the treated product. In view of this an extract should be used the boiling limits of which differ sufficiently from those of the alcohol because in that case no extract passes over together with the alcohol when distilling off the latter from the hydrolyzed alkyl-sulphuric acid treated with extract. Also in the case of a mixture of alcohol and water being shaken out with extract care should be taken to select such an extract as to make it possible to obtain the alcohol free from extract on fractionation of the treated material.

From the above it appears that the treatment with extract will be preferably applied to alkyl-sulphuric acid which has been diluted with water and which may or may not be partly or completely hydrolyzed because, as compared with the treatment of the if desired aqueous alcohol previously separated therefrom, this will save one run in distillation.

An additional advantage obtained according to the latter embodiment lies in that the sulphuric acid used for the absorption of the olefine may be more easily regenerated.

The present process does not aim at treating undiluted alkyl-sulphuric acid with extract except in those cases where a fairly diluted sulphuric acid has been used as initial material for treating the olefines with sulphuric acid. Such in view of the fact that the presence of very concentrated sulphuric acid prevents a sufficient separation of extract and alkyl-sulphuric acid.

Examples 1. 250 litres alkyl-sulphuric acid, obtained by absorption of propylene in sulphuric acid of 96% strength (1½ mol. propylene to 1 mol. sulphuric acid) is diluted with 5 parts of water and subsequently heated during 1 hour at approx. 80° C., whereby hydrolysis takes place. The mixture is then allowed to cool, after which it is shaken out in three subsequent runs, each time using 25 litres Edeleanu extract of a kerosene fraction. The extracted material is subjected to fractional distillation, by which a constant boiling mixture of iso-propyl alcohol and water passes over at approx. 80° C. After drying this fraction with potash it is once more subjected to distillation, whereby pure iso-propyl alcohol, free from obnoxiously smelling substances, is obtained.

2. Alkyl-sulphuric acid, obtained by absorption of isobutylene in sulphuric acid of 65% strength (1.8 mol. isobutylene to 1 mol. sulphuric acid) is neutralized with aqueous ammonia of 25% strength and subsequently subjected to fractional distillation. The mixture of tertiary butyl alcohol and water, which passes over at approx. 80° C., containing varying proportions of an oily polymer, is diluted with an equal volume of water and subsequently shaken out in three subsequent runs, each time using 25 per cent by weight of Edeleanu extract of a spindle oil fraction (calculated on the tertiary butyl alcohol present). The extracted material is then freed from water with the aid of a drying agent and rectified. A product having a boiling point of 83° C., melting point 24° C. of excellent odor is thus obtained.

We claim:

1. A process of purifying alcohols containing polymerization products which comprises subjecting the same to an extraction treatment with a liquid mixture consisting predominantly of cyclic hydrocarbons obtained from oil by extraction with a solvent for naphthenes.

2. A process of purifying alcohols containing polymerization products which comprises subjecting the same after dilution with water to an extraction treatment with a liquid mixture consisting predominantly of aromatic and naphthenic hydrocarbons obtained from mineral oil by extraction with a solvent for naphthenes.

3. A process of purifying secondary alcohols containing polymerization products which comprises subjecting the same to an extraction treatment with a liquid mixture consisting predominantly of aromatic and naphthenic hydrocarbons obtained from mineral oil by extraction with a solvent for naphthenes.

4. A process of purifying tertiary alcohols containing polymerization products which comprises subjecting the same to an extraction treatment with a liquid mixture consisting predominantly of aromatic and naphthenic hydrocarbons obtained from mineral oil by extraction with a solvent for naphthenes.

5. A process of purifying alcohols containing polymerization products while in the presence of dilute acid which comprises subjecting the same to an extraction treatment with a liquid mixture consisting predominantly of cyclic hydrocarbons obtained from mineral oil by extraction with a solvent for naphthenes.

6. The step of subjecting a dilute acid liquor to an extraction treatment with a liquid mixture consisting predominantly of aromatic and naphthenic hydrocarbons obtained from mineral oil by extraction with a solvent for naphthenes.

7. The steps of at least partially hydrolyzing an acid liquor and then subjecting the same to an extraction treatment with a liquid mixture consisting predominantly of cyclic hydrocarbons obtained from mineral oil by extraction with a solvent for naphthenes.

8. The steps of substantially completely hydrolyzing an acid liquor and then subjecting the same to an extraction treatment with a liquid mixture consisting predominantly of aromatic and naphthenic hydrocarbons obtained from mineral oil by extraction with a solvent for naphthenes.

9. The step of subjecting a neutralized acid liquor to an extraction treatment with a liquid mixture consisting predominantly of cyclic hydrocarbons obtained from mineral oil by extraction with a solvent for naphthenes.

10. A process of purifying alcohols containing polymerization products which comprises subjecting the same to an absorption treatment with a liquid extract obtained by the extraction of a mineral oil with a solvent of the class consisting of liquid sulfur dioxide, furfurol and acetone.

11. The step of subjecting a dilute acid liquor to an absorption treatment with a liquid extract obtained by the extraction of a mineral oil with a solvent of the class consisting of liquid sulfur dioxide, furfurol and acetone.

12. The steps of at least partially hydrolyzing an acid liquor and then subjecting the same to an absorption treatment with a liquid extract obtained by the extraction of a mineral oil with a solvent of the class consisting of liquid sulfur dioxide, furfurol and acetone.

13. The step of subjecting a neutralized acid liquor to an absorption treatment with a liquid extract obtained by the extraction of a mineral oil with a solvent of the class consisting of liquid sulfur dioxide, furfurol and acetone.

14. In a process of purifying an alcohol, the steps of agitating the alcohol with a plurality of charges of liquid extract obtained by the extraction of a mineral oil with a solvent of the class consisting of liquid sulfur dioxide, furfurol and acetone, and distilling the alcohol.

15. The step of subjecting an aqueous alcoholic mixture to an absorption treatment with a liquid extract obtained by the extraction of a mineral oil with a solvent of the class consisting of liquid sulfur dioxide, furfurol and acetone.

HERMANUS FRANS JOSEPH LORANG.
PIETER W. van der SLUIJS.